Dec. 16, 1969   P. A. THIEBERGER   3,484,703
PULSE HEIGHT COMPENSATION IN TIME TO AMPLITUDE CONVERSION
Filed Nov. 9, 1966   2 Sheets-Sheet 1

INVENTOR.
PEDRO A. THIEBERGER
BY

United States Patent Office 3,484,703
Patented Dec. 16, 1969

3,484,703
PULSE HEIGHT COMPENSATION IN TIME TO
AMPLITUDE CONVERSION
Pedro A. Thieberger, Shirley, N.Y., assignor to the United
States of America as represented by the United States
Atomic Energy Commission
Filed Nov. 9, 1966, Ser. No. 593,599
Int. Cl. H03k 5/20
U.S. Cl. 328—129                               5 Claims

ABSTRACT OF THE DISCLOSURE

This invention is useful in the field of nuclear physics wherein nuclear charged particles or gamma rays are detected by producing pulses whose amplitudes correspond to the charged particle or gamma ray energy. In the time analysis system for these detectors, time to amplitude converters are employed, and in accordance with this invention the pulse height dependence of the time measurement performed by the time to amplitude converter is cancelled by using correcting signals from a second converter to which slow pulses from the detectors are fed.

This invention was made in the course of, or under a contract with the U.S. Atomic Energy Commission.

PRIOR ART

In the field of physics the problem of timing the arrival of pulses from nuclear detectors without introducing errors due to the different amplitudes of those pulses has been a long standing problem ever since fast coincidence work began. Besides the most obvious, but often disadvantageous, possibility of restricting the pulse heights to be accepted from each detector to a narrow range, a number of more or less successful devices have been developed in order to solve this problem. These systems have been of two types, comprising systems in which correction is introduced prior to the triggering of the time defining stage, and systems in which the use of time to amplitude converters makes it possible to introduce a correction after the conversion has taken place. These systems, however, have not realized the ultimate time resolution of which the detectors, such as scintillators and photomultipliers, have been capable or have depended on linear functions of pulse height, which has limited the pulse height range to a low level. Moreover, both systems have been inefficient, inaccurate or otherwise unsatisfactory in high counting rate situations where a large number of pulses from the correcting devices (corresponding to all the single pulses from both detectors) have arrived at the multi-channel pulse height analyzer and at the amplifier preceeding it. Even though these pulses are not accepted for analysis, their presence where high counting rates are involved has produced broadening and shifts of the time spectrum due, e.g., to pulse summing or base line shift in their amplifiers. This has been particularly undesirable in experiments where small centroid shifts of the time spectrum have to be measured.

It is an object of this invention therefore to provide a system for pulse height compensation in time to amplitude conversion, which gives correcting signals only when a coincidence between pulses from both detectors is recorded;

It is another object of this invention to provide a simple and effective system for pulse height compensation in time to amplitude conversion over a wide range of pulse heights;

It is a further object of this invention to eliminate unnecessary compensator or correcting pulses from reaching the analyzer in a time to amplitude conversion system for nuclear detectors;

It is a further object of this invention to provide good time resolution in a time to amplitude conversion system for nuclear detectors;

It is a still further object of this invention to provide a nuclear detector system having provision for experiments where small centroid shifts of the time spectrum of the nuclear particles to be detected have to be measured.

DESCRIPTION OF THE INVENTION

In accordance with this invention a time to amplitude converter system is provided for two nuclear detectors in which correcting signals for the time to amplitude converters are provided only when coincidence between pulses from both detectors is recorded and is capable of accurate compensation over a wide range of pulse heights. More particularly, in one embodiment this invention comprises first and second detectors, first means for producing gating pulses for producing first discriminator output signals and second discriminator output signals having a time overlap of about 50% when the signals from the detectors are in coincidence and close to maximum amplitude, second means for producing correcting signals cancelling the pulse height dependence of the discriminator output signals, and time delay means which provides for correcting signals only when a coincidence between pulses from both detectors is recorded and capable of accurate compensation, over a wide range of pulse heights. With the proper selection of components and their arrangement, as described in more detail hereinafter, the desired time to amplitude conversion and corrections therefor are made. In actual practice, for example, this embodiment provides a maximum displacement of the prompt curve of at least $3 \times 10^{-11}$ sec. over a pulse height range of 1 to 5.5 for the two detectors.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

In the drawings where like elements are referenced alike:

Figure 1:
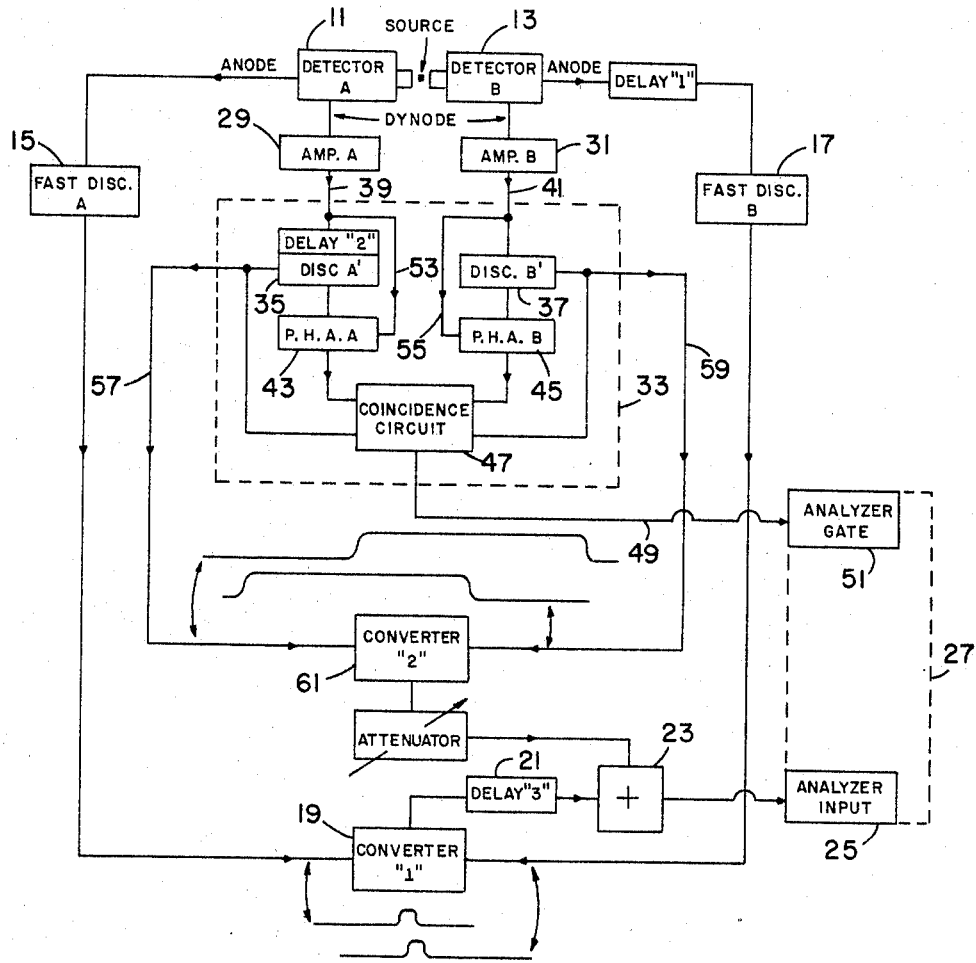
FIGURE 1 is a partial schematic drawing of the delayed coincidence and pulse height compensation system of this invention.

In understanding the principles of this invention, one can for the moment neglect the statistical fluctuations contributing to the width of the prompt time spectrum and consider only those fluctuations arising from the spread of pulse heights.

We neglect for the moment the statistical fluctuations contributing to the width of the prompt time spectrum and consider only those fluctuations arising from the spread of pulse heights.

Let $$v_1(t) = V_1 \cdot f_1(t) \tag{1}$$

$$v_2(t) = V_2 \cdot f_2(t-T) \tag{2}$$

represent two pulses at the input to the discriminators. $v_1(t)$ and $v_2(t)$ are the variations in time $t$ of the voltages (or currents) corresponding to the early and late pulse respectively. $V_1$ and $V_2$ are the amplitudes, $f_1$ and $f_2$ represent both pulse shapes and $T$ is the time difference between the events giving rise to both pulses. If $F_1$ and $F_2$ are the reciprocal functions of $f_1$ and $f_2$ respectively and of $V_1^o$ and $V_2^o$ are the triggering levels of the discriminators, we get the following values for the times $t_1$ and $t_2$ at which each discriminator is triggered:

$$t_1 = F_1\left(\frac{V_1^o}{V_1}\right) \quad (3)$$

$$t_2 = F_2\left(\frac{V_2^o}{V_2}\right) + T \quad (4)$$

The output $A_1$ from the time to amplitude converter will be proportional to $(t_2-t_1)$ and is written as follows:

$$A_1 = K(t_2-t_1) = K\left[T + F_2\left(\frac{V_2^o}{V_2}\right) - F_1\left(\frac{V_1^o}{V_1}\right)\right] \quad (5)$$

The method employed in the present work for obtaining correcting signals, which when added to $A_1$, cancel the pulse height dependent terms in Equation 5 is the following:

In addition to the fast pulses from the detectors, slow pulses $v_1'(t)$ and $v_2'(t)$ are also derived and fed to two discriminators whose outputs serve as the inputs to another time to pulse height converter. If we assume that the pulse heights $V_1'$ and $V_2'$ of these pulses are proportional to $V_1$ and $V_2$ and that the pulse shapes $f_1'$ and $f_2'$ are the same as $f_1$ and $f_2$ but on a longer time scale, i.e.:

$$f_1'(t) = f_1(1/c \cdot t) \quad (6)$$

with $c \gg 1$ $$f_2'(t) = f_2(1/c \cdot t) \quad (7)$$

we have $$v_1'(t) = bV_1 \cdot f_1(1/c \cdot t) \quad (8)$$

$$v_2'(t) = bV_2 \cdot f_2[1/c(t-T)] \quad (9)$$

If the discriminators are set at $b \cdot V_1^o$ and $b \cdot V_2^o$ respectively, their triggering times will be given by $$t_1' = cF_1\left(\frac{V_1^o}{V_1}\right) \quad (10)$$

$$t_2' = cF_2\left(\frac{V_2^o}{V_2}\right) + T \quad (11)$$

The output pulses from the discriminators are now fed to the second time to amplitude converter. Pulse "1" is delayed by a time D in such a way that it arrives after pulse "2." The output from this converter is then given by:

$$A = {}_2K'(D + t_1' - t_2') = K'\left[D + cF_1\left(\frac{V_1^o}{V_1}\right) - cF_2\left(\frac{V_2^o}{V_2}\right) - T\right] \quad (12)$$

If we now attenuate $A_2$ by a factor $K'c/K$ and sum it to $A_1$ we obtain:

$$A = A_1 + \frac{K}{K'c}A_2 = K\left[T\left(1-\frac{1}{c}\right) + \frac{D}{c}\right] \quad (13)$$

The amplitude dependent terms have thus been eliminated.

Now we briefly consider the statistical fluctuations which had been neglected above. In order to calculate an upper limit for their contribution to the time spread of the prompt curve we shall assume that there is no statistical correlation between the fluctuations of $A_1$ and $A_2$. Calling $\sigma(A_1)$ and $\sigma(A_2)$ the standard deviations of the outputs from the converters "1" and "2" respectively when pulses of constant amplitude from both detectors are selected, we can write the standard deviation $\sigma(T)$ of T as follows (cf. Equation 13):

$$\sigma(T) \leq \sqrt{\left[\frac{\sigma(A_1)}{K(1-1/c)}\right]^2 + \left[\frac{\sigma(A_2)}{K'(c-1)}\right]^2} = \frac{1}{1-1/c}\sqrt{\left[\frac{\sigma(A_1)}{K}\right]^2 + \left[\frac{\sigma(A_2)}{K'c}\right]^2} \quad (14)$$

Then if $\sigma_1(T)$ and $\sigma_2(T)$ are the standard deviations of the time measurements performed in converters "1" and "2" respectively under the above mentioned conditions, we have according to Equations 5 and 12, $$\sigma(T) \leq \frac{1}{1-1/c}\sqrt{[\sigma_1(T)]^2 + \left[\frac{\sigma_2(T)}{c}\right]^2} \quad (15)$$

For the arrangement described in the next paragraph $c \simeq 20$ and $\sigma_2(T) \simeq 4\sigma_1(T)$. Therefore in this case $$\sigma(T) \simeq 1.07 \cdot \sigma_1(T)$$

The upper limit of the contribution to the standard deviation of the prompt curve due to the correcting system is thus in our case $\simeq 7\%$.

Referring now to FIGURE 1, in a practical system incorporating the system of this invention a nuclear particle or gamma ray source is interposed between detectors 11 and 13, which are plastic scintillators mounted on photomultipliers. The anode of the detectors 11 and 13 connect respectively with fast discriminators 15 and 17, which in turn are connected to time to amplitude converter 19. The output of this converter 19 passes through delay 21 to junction 23 and the analyzer input 25 in analyzer 27. These elements, comprise fast discriminators and a fast converter operative on each of their respective detector signals for providing, as will be understood in more detail hereinafter, correcting signal cancelling the pulse height dependence of each of the discriminator output signals and for summing and providing a compensated signal. In this regard, summing is provided by two resistors.

The dynodes of detectors 11 and 13 connect respectively with amplifiers 29 and 31 for actuation of analyzer gate circuit 33. This circuit 33, has two slow discriminators 35 and 37, which are connected respectively to the outputs 39 and 41 of amplifiers 29 and 31. The discriminators 35 and 37 are connected respectively to two pulse height analyzers 43 and 45, which are connected in parallel to coincidence circuit 47 having a connection 49 with analyzer gate 51 for analyzer 27. Leads 53 and 55 connect the outputs 39 and 41 respectively to the pulse to height analyzers 43 and 45 while leads 57 and 59 connect discriminators 35 and 37 respectively to fast time to amplitude converter 61.

In accordance with this invention the outputs from the same discriminators have been used to give pulses to the coincidence circuit 47 as well as to a second fast time to amplitude converter 61 (like converter 19) connected respectively to the slow discriminators 35 and 37. Two discriminators at each input of converter 61, may be used for the sole purpose of shaping the pulses fed to the converter 61 in a suitable manner. No special efforts are required to ensure that the pulses at the inputs of discriminators 35 and 37 have similar shapes to those at the inputs of discriminators 15 and 17. It is only necessary to increase somewhat the rise time of the output pulses from amplifiers 29 and 31 in order to make constant $c$ in Equations 6 and 7 above sufficiently large where $t = $ time and $f'_1$, $f_1$, $f'_2$ and $f_2 = $ pulse shapes. To this end delay 21 compensates for the delays in the slow amplifiers 29 and 31 and the slow discriminators 35 and 37.

In operation the discriminators 35 and 37 are operated in the "leading edge mode" and delay 21 is adjusted so that there is a pulse overlap of about 50% at the input of converter 61 when coincident signals of close to the maximum amplitude are selected. Also, the appropriate discrimination levels of the fast discriminators 15 and 17 are about the same as the fractional pulse height of the slow discriminators 35 and 37. In order to calibrate the system, pairs of equal lengths of air-dielectric fixed delay lines are introduced at both outputs of one of the detectors 11 or 13.

Figure 2:
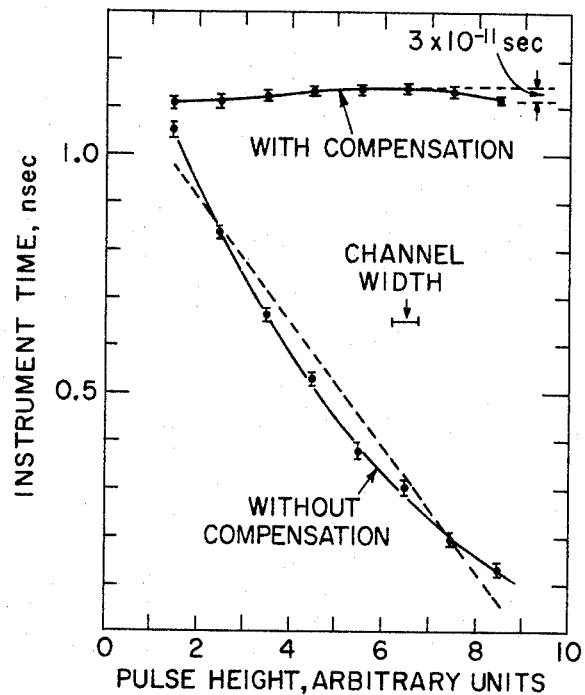
FIGURE 2 is a graphic illustration of the displacement of the centroid of the prompt curve from radiations from the gamma rays from the decay of $Co^{60}$ without compensation and with compensation, in accordance with this invention, as a function of pulse heights from one of the detectors of FIGURE 1.

The displacement of the centroid of the prompt curve with and without compensation, as a function of pulse heights from one of the detectors is shown in FIG. 2. The $\gamma$ rays from the decay of $Co^{60}$ were used as prompt radiations and the points of maximum pulse height in FIG. 2 correspond to the upper edge of the Compton electron spectrum ($\sim$930 kev.). In the second detector pulses corresponding to energy losses from approximately 300 kev. to 930 kev. were accepted. The levels of the fast discriminators were set at about 10% of the maximum pulse height.

As can be seen FIG. 2, the curvature of the non-compensated curve of displacements has been slightly overcompensated. A somewhat better correction is obtained by lowering somewhat the discrimination levels of discriminators 35 and 37 and by re-adjusting the attenuator at the output of converter 61. In any case the maximum displacement of $3 \times 10^{-11}$ sec. obtained over a pulse height range of about 1:5.5 is adequate for most applications. It can be seen from FIG. 2 that if a linear compensation is attempted over the same range of pulse heights an optimum adjustment leads to a maximum displacement of about $1.5 \times 10^{-10}$ sec. which is 5 times larger than the one obtained with the present system.

Figure 3:
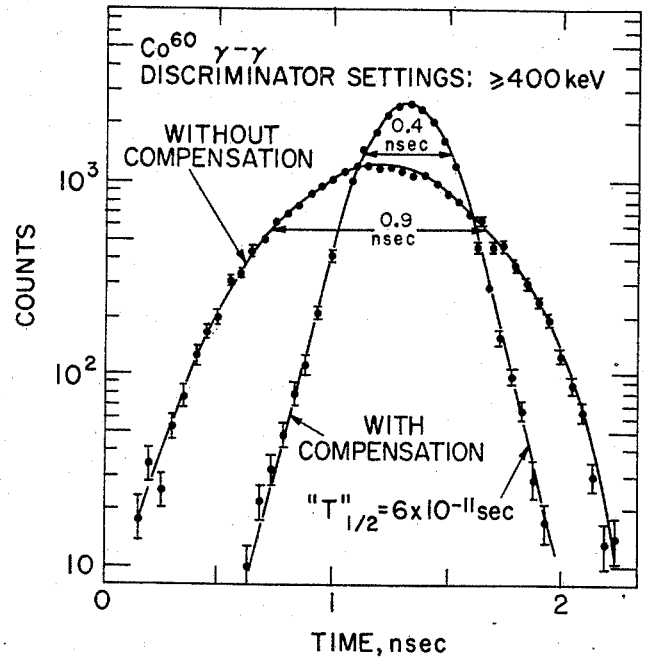
FIGURE 3 is a graphic illustration of the improvement in time resolution obtained by means of the compensation system of this invention, wherein pulses corresponding to energy losses in scintillators from 400 kev. to 930 kev. were accepted.

FIGURE 3 shows the improvement in time resolution obtained by means of the compensation system. In this case pulses corresponding to energy losses in the scintillators from 400 kev. to 930 kev. were accepted.

Actual tests have shown that this invention has the advantage of providing the desired compensation and of accepting widely different pulse heights, several times better than the best that can be achieved with linear compensation. Furthermore, with the arrangement of this invention no unnecessary pulses from the compensator reach the analyzer. Also, the time resolution obtained is good and the system of this invention is particularly advantageous for experiments where small centroid shifts of the time spectrum have to be measured.

What is claimed is:

1. In a time analysis system for two nuclear particle detectors for producing slow and fast pulse signals whose amplitudes correspond to the energy of incident radiation impinging on said detectors, having means for time to amplitude conversion of said pulse signals, wherein there tends to occur over at least a portion of the band of pulse signal amplitudes produced a pulse height dependence of the time measurement performed by said time to amplitude conversion, the improvement, comprising correcting means for cancelling the pulse height dependence of said time to amplitude conversion by delaying the fast pulses and producing correction signals in operable association with the slow pulses from said detectors to produce output signals only when said pulse signals from both of said detectors are in coincidence and near their maximum amplitude for the accurate compensation of the pulse height dependence of said conversion over a broad range of pulse signal amplitude from said detectors.

2. The time analysis system of claim 1 in which said correcting means provides gating pulses for producing first and second discriminator output signals having a time overlap of about 50% when the pulses from the detectors are in coincidence and close to their maximum amplitude, and said correcting means has time delay means that provides for said correcting signals only when a coincidence between pulses from both detectors is capable of accurate compensation over a wide range of pulse heights.

3. The time analysis system of claim 1, comprising:
 (a) correcting means having a pair of slow discriminators each operating in a leading edge mode on a separate pulse from said detectors for providing a gating pulse and for producing a first discriminator output signal and a second discriminator output signal having a time overlap of about 50% when said detector pulses are in coincidence and close to their maximum amplitude, and including
 (b) means having fast discriminators and converters operative on each of said detector pulses for providing a correcting signal cancelling the pulse height dependence of each of said discriminator output signals and for summing and providing a compensated signal, said latter means incorporating a time delay in that fast discriminator receiving the detector pulse which is not acted upon by a time delay in said former means having a pair of slow discriminators.

4. The time analysis system of claim 1 in which said correcting means, comprises first and second fast discriminators for said detectors, time delay means interposed between one of said detectors and fast discriminators, an output producing first converter for said discriminators for providing correcting signals cancelling the pulse height dependance of said discriminators, time delay means for said converter having an analyzer for said converter output, and gating pulse means for enabling said analyzer, comprising a pair of slow discriminator means, time delay means for one of said slow discriminators, pulse height analyzer means for each of said slow discriminators, coincidence circuit means having analyzer gate means responsive thereto for enabling said analyzer, and second converter means responsive to said slow discriminators for producing correcting signals cancelling the pulse height dependence of said slow discriminators when said gating pulse means enables said analyzer.

5. The method of compensating for the pulse height dependence of the time measurement performed by time to amplitude converter means for two pulse producing nuclear particle detectors, wherein coincidence between pulses from said detectors occurs over a wide range of pulse heights, comprising providing correcting signals for said time to amplitude conversion for producing said conversion only when said coincidence between said pulses from said detectors is capable of accurate compensation over said wide range of pulse heights.

References Cited

UNITED STATES PATENTS

| | | | |
|---|---|---|---|
| 2,605,410 | 7/1952 | Friend | 328—109 |
| 2,866,893 | 12/1958 | Minneman et al. | 328—133 |
| 3,015,737 | 1/1962 | Harris et al. | 328—133 X |
| 3,320,419 | 5/1967 | Thomas et al. | 250—71.5 |

DONALD D. FORRER, Primary Examiner

R. C. WOODBRIDGE, Assistant Examiner

U.S. Cl. X.R.

250—71.5, 83.3; 307—293, 308; 328—109